(12) United States Patent
Herzog

(10) Patent No.: US 10,173,537 B2
(45) Date of Patent: Jan. 8, 2019

(54) CHARGING DEVICE FOR AN ELECTRIC VEHICLE

(71) Applicant: Bayerische Motoren Werke Aktiengesellschaft, Munich (DE)

(72) Inventor: Torsten Herzog, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 255 days.

(21) Appl. No.: 14/829,189

(22) Filed: Aug. 18, 2015

(65) Prior Publication Data

US 2016/0039298 A1   Feb. 11, 2016

Related U.S. Application Data

(63) Continuation of application No. PCT/EP2014/053064, filed on Feb. 18, 2014.

(30) Foreign Application Priority Data

Feb. 19, 2013   (DE) .................... 10 2013 202 591

(51) Int. Cl.
*H02J 7/00* (2006.01)
*B60L 11/18* (2006.01)
(Continued)

(52) U.S. Cl.
CPC ........... *B60L 11/1818* (2013.01); *B60L 11/14* (2013.01); *B60L 11/185* (2013.01);
(Continued)

(58) Field of Classification Search
USPC ....................................................... 320/109
See application file for complete search history.

(56) References Cited

U.S. PATENT DOCUMENTS 5,417,579 A   5/1995   Yoshioka et al.
5,584,712 A   12/1996  Fukushima
(Continued)

FOREIGN PATENT DOCUMENTS

DE   44 32 194 A1   4/1995
DE   44 47 023 A1   8/1995
(Continued)

OTHER PUBLICATIONS

International Search Report dated Oct. 16, 2014 with English translation (Six (6) pages).
(Continued)

*Primary Examiner* — Robert Grant
(74) *Attorney, Agent, or Firm* — Crowell & Moring LLP

(57) ABSTRACT

A charging device for an electric vehicle has a first charging connector on the vehicle side for mechanically connecting to a second charging connector of an external charging station. The first charging connector has two contact elements for a DC charging process. A galvanic connection of the contact elements to an electric energy store is provided, wherein direct current flows into the electric energy store. A control device monitors the charging process and is capable of communicating with the charging station. The charging device has at least one contact element movable between a first and a second position. In the first position, the contact element is retracted in the first charging connector, and in the second position the contact element is arranged so as to contact a corresponding contact of the second charging connector when the first and the second charging connectors are mechanically connected.

18 Claims, 4 Drawing Sheets

(51) Int. Cl.
 *B60L 11/14* (2006.01)
 *H01R 13/44* (2006.01)
 *H01R 13/703* (2006.01)
(52) U.S. Cl.
 CPC ....... *B60L 11/1824* (2013.01); *B60L 11/1846* (2013.01); *B60L 11/1848* (2013.01); *H02J 7/0042* (2013.01); *H02J 7/0055* (2013.01); *B60L 2210/30* (2013.01); *H01R 13/44* (2013.01); *H01R 13/7038* (2013.01); *H02J 2007/0096* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/169* (2013.01); *Y04S 30/14* (2013.01)

(56) References Cited

U.S. PATENT DOCUMENTS

| | | |
|---|---|---|
| 6,123,569 A | 9/2000 | Fukushima et al. |
| 2011/0172839 A1 | 7/2011 | Brown et al. |
| 2011/0277516 A1 | 11/2011 | Kahara et al. |
| 2011/0300733 A1 | 12/2011 | Janarthanam et al. |
| 2012/0045923 A1 | 2/2012 | Ohmura |
| 2012/0088384 A1 | 4/2012 | Hori et al. |
| 2012/0135634 A1* | 5/2012 | Gaul .................. B60L 11/1818 439/488 |
| 2012/0229085 A1* | 9/2012 | Lau ..................... B60L 11/1818 320/109 |
| 2013/0137286 A1* | 5/2013 | Smith .................. E05B 47/026 439/304 |
| 2014/0203777 A1 | 7/2014 | Flack |

FOREIGN PATENT DOCUMENTS

| | | |
|---|---|---|
| DE | 10 2010 045 131 A1 | 3/2012 |
| DE | 20 2010 013 055 U1 | 4/2012 |
| DE | 10 2010 061 185 A1 | 6/2012 |
| WO | WO 2011/127446 A2 | 10/2011 |

OTHER PUBLICATIONS

German-language Search Report dated Apr. 30, 2013 with Partial English translation (Eleven (11) pages).

Phoenix Contact, "PLUSCON Power AC-und DC-Steckverbinder fuer Ladestationen und Elektrofahrzeuge", Oct. 6, 2011 (Twelve (12) pages).

* cited by examiner

CHARGING DEVICE FOR AN ELECTRIC VEHICLE

CROSS REFERENCE TO RELATED APPLICATIONS

This application is a continuation of PCT International Application No. PCT/EP2014/053064, filed Feb. 18, 2014, which claims priority under 35 U.S.C. § 119 from German Patent Application No. 10 2013 202 591.2, filed Feb. 19, 2013, the entire disclosures of which are herein expressly incorporated by reference.

BACKGROUND AND SUMMARY OF THE INVENTION

The invention relates to a charging device for an electric vehicle.

Various charging technologies using cables are known for the charging of an electrical energy storage device of an electrically driven motor vehicle. First, there is the technology of charging using alternating current (AC), wherein there is a corresponding charging device in the vehicle which has an AC/DC converter. In addition, direct current (DC) charging is known, wherein the charging device is situated in an external charging station outside of the vehicle, and direct current is fed via an electric cable from the charging station to the energy storage device in the vehicle. In most cases, the charging capacity is greater in DC charging than in AC charging.

The vehicle can be connected to the charging station for AC and/or DC charging via various types of plug systems. For DC charging, the charging connector on the vehicle is configured with corresponding contact elements which are galvanically connected to the electrical energy storage device being charged in the vehicle. In this case, assurances must be made that if a person touches the contact elements with a finger, when the charging connector is unoccupied, current does not flow through the person. This is achieved conventionally by opening switch devices, such as contactors, for example, in the electrical connection lines between the contact elements and the electrical energy storage device.

The problem addressed by the invention is that of creating a simple charging device for an electric vehicle which ensures protection against the touching of DC contact elements.

This problem is addressed by the charging device according to embodiments of the invention, which is intended for an electric vehicle, that is, it is a charging device positioned on-board the vehicle. The term "of the electric vehicle" should be understood broadly, and can include any type of motor vehicle which can be driven electrically, and wherein the energy storage device thereof can be charged electrically. This can be a vehicle driven only by electricity, and optionally also a hybrid vehicle which has an internal combustion engine in addition to an electric drive.

The charging device serves the purpose of charging an electrical energy storage device configured for the drive of the electric vehicle. The term "electrical energy storage device" in this case should be understood broadly, and can particularly include a plurality of electrical energy storage devices and/or storage elements. In one preferred variant, the electrical energy storage device is a high-voltage battery.

The charging device includes a first charging connector on-board the vehicle, that is, the charging connector is made for installation in the electric vehicle. The first charging connector serves the purpose of making a mechanical connection to a second charging connector of an external charging station which does not belong to the vehicle. The second charging connector and/or the charging station in this case are not part of the charging device according to the invention. The first charging connector of the charging device has two contact elements for the purpose of charging the electrical energy storage device in the electric vehicle using direct current. These contact elements are capable of producing an electrical connection to the charging station, via the contacting of two contacts of the second charging connector, when the first and the second charging connectors are connected mechanically. The charging device also includes a galvanic connection from the contact elements to the electrical energy storage device, wherein—if the charging uses direct current—direct current flows into the electrical energy storage device, to charge the same, via the galvanic connection. The direct current is fed to the contact elements of the first charging connector via the contact elements of the second charging connector. The charging device also includes a control device for the purpose of monitoring the charging process of the electrical energy storage device, wherein the control device is able to communicate with the charging station.

The charging device is characterized in that at least one of the two contact elements of the first charging connector is able to move between a first and a second position. In this case, the at least one contact element in the first position is withdrawn into the first charging connector, and particularly retracted. The term "withdrawn" in this case should be understood to mean that the corresponding contact element is not accessible to the touch of a user from outside of the vehicle when the first charging connector is unoccupied. Accordingly, the at least one contact element is arranged in the second position in such a manner that it contacts the corresponding contact of the second charging connector when the first and the second charging connectors are connected mechanically. The control device in this case controls the movement of the at least one contact element in such a manner that this contact element is moved into the second position only upon a mechanical connection between the first and the second charging connector, and otherwise is in the first position.

An efficient protection against touch is achieved by means of the charging device according to the invention by a mechanically movable contact element. In the configuration, the forces resulting from the insertion of the plug when the first charging connector, on-board the vehicle, is brought together with the second charging connector, of the charging station, are reduced because the contact between the corresponding contact elements and contacts, which involves friction, occurs after the mechanical connection of the charging connectors.

In one particularly preferred embodiment of the charging device according to the invention, the galvanic connection to the electrical energy storage device cannot be interrupted—that is, there are no switches, and specifically no contactors, to interrupt this connection. In this way, it is possible to reduce the costs of the charging device because it is possible to dispense with corresponding switches and/or contactors. Nonetheless, the configuration still ensures protection against touch as a result of the fact that the contact elements remain in the withdrawn position when the charging connector is unoccupied.

In a further preferred embodiment of the charging device according to the invention, the two contact elements used for direct current charging are contact pins which preferably contact, as contacts, corresponding contact sleeves in the second charging connector.

In a further, particularly preferred embodiment, the charging device can also carry out an alternating current charging process if required. In this case, the charging device also has further contact elements for the purpose of charging using alternating current. These contact elements are connected to an AC/DC converter which is included for the purpose of converting the supplied alternating current into direct current for the purpose of charging the electrical energy storage device.

Depending on the embodiment, the first charging connector of the charging device can have different designs. In a particularly preferred embodiment, the first charging connector is based on the IEC 62196-3 standard, which describes plug connectors for simultaneous direct current and alternating current charging. The charging connector is preferably of the COMBO1 or COMBO2 type or the DC-Type 2 of the IEC 62196-3 standard. Nonetheless, the first charging connector can also have a different design. In addition, contact elements which are used both for direct current and for alternating current charging can also be designed as movable contact elements according to the invention.

In one particular embodiment, both contact elements, used for the purpose of direct current charging, are configured as contact elements with protection against touch, and can move from the first into the second position. In this way, the protection against touch is further improved.

In a further embodiment, the charging device has a locking device to lock the second charging connector in the first charging connector upon a mechanical connection between the first and the second charging connector. Such locking devices are known in the prior art. The locking in this case is preferably implemented by the control device of the charging device when a mechanical connection between the first and second charging connector is detected.

In a further embodiment of the charging device according to the invention, upon the mechanical connection between the first and the second charging connector, a communication connection is established between the control device and the external charging station, and particularly a corresponding control device of the external charging station. The communication connection is particularly made via an electric contact. In one preferred embodiment, the known pilot connection is used for the communication.

In one particularly preferred variant, a charging communication is carried out via the communication connection described above, for the purpose of setting parameters in the charging device by way of the control device. When the control device allows the direct current charging as part of the charging communication, the at least one contact element is moved from the first into the second position. This means that the electric contact for the direct current charging process is only established once the direct current charging actually starts, thereby increasing the safety.

In a further embodiment, the at least one contact element is moved via an actuator which is driven electrically. The at least one contact element in this case is preferably held in the first position via a return force, and moved from the first into the second position via the actuator, against the return force. In this way, even if the actuator fails, the configuration ensures that the contact element is in the withdrawn position.

In addition to the charging device described above, the invention also relates to an electric vehicle which has an electrical energy storage device to drive the same, wherein the electric vehicle includes the charging device described above and/or one or more preferred variants of the charging device described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
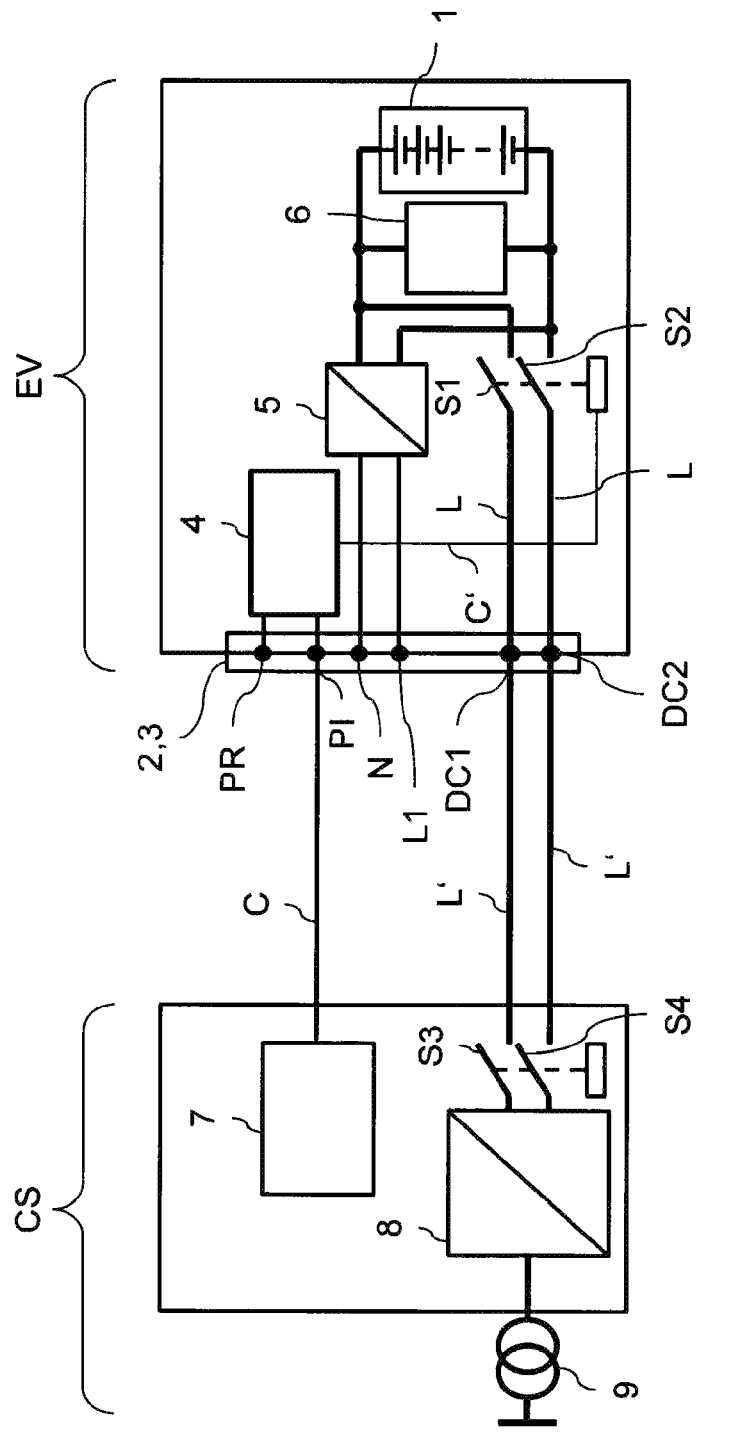
FIG. 1 is a schematic illustration of a charging architecture for the direct current charging of a vehicle according to the prior art.
Figure 3:
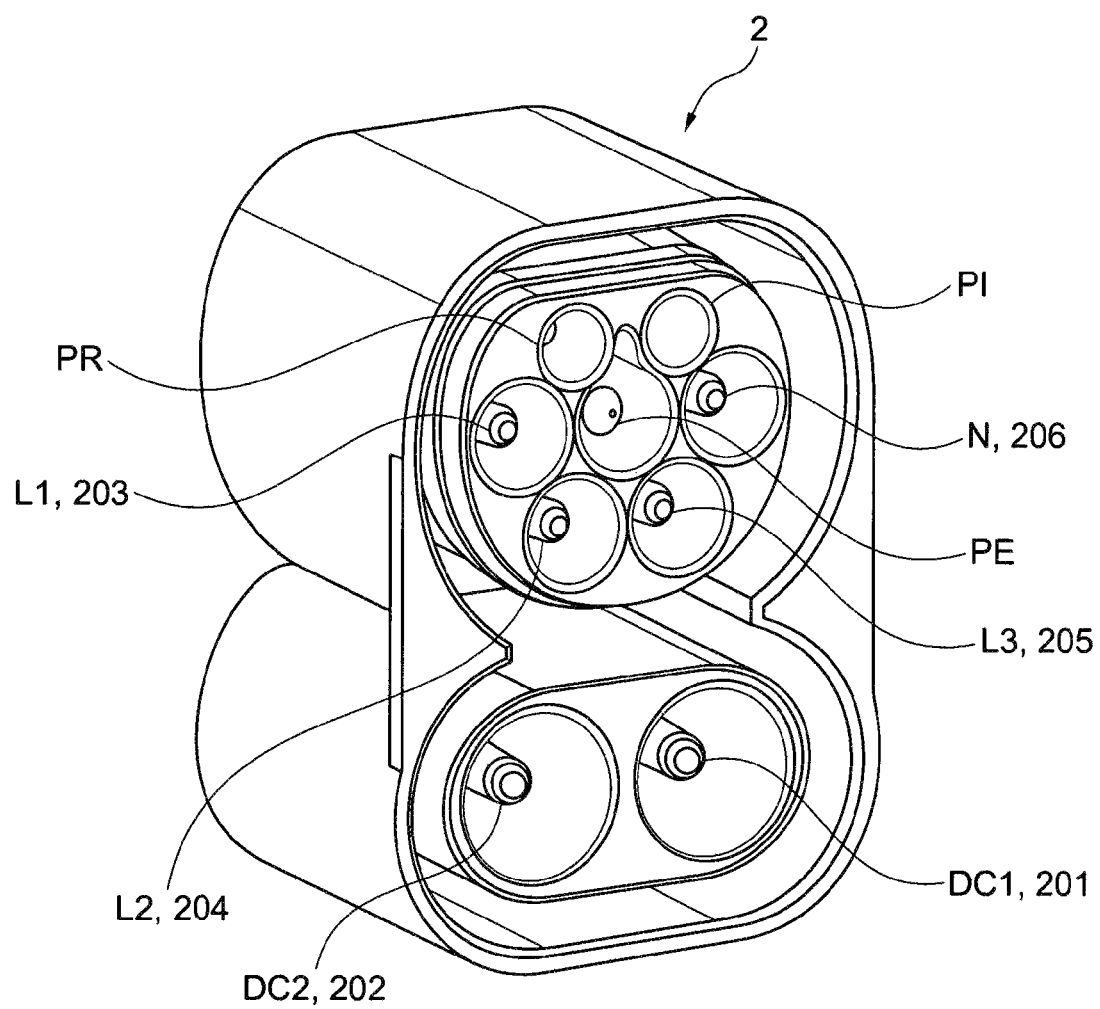
FIG. 3 is a perspective view of one example of a charging socket on-board the vehicle, which can be used in one embodiment of the charging device according to the invention.

FIG. 1 is a schematic illustration of a charging architecture for the direct current charging of a vehicle according to the prior art. Components of the vehicle EV are shown in the portion of FIG. 1 at right. The vehicle in this case can be a purely electric vehicle, or optionally a hybrid vehicle, which can be driven via an electric motor by way of an electrical energy storage device and/or a battery 1 in the form of electrochemical storage cells. The electrical energy storage device 1 is charged, in the scenario in FIG. 1, via a charging station CS which is represented in this figure at left. A first charging connector 2 at the vehicle end EV of the connection is connected in this case to a corresponding second charging connector 3 at the charging station CS end of the connection. The construction of the charging connectors is not visible in greater detail in FIG. 1, but is known from the prior art. FIG. 3, described further below, shows one example of a first charging connector 2 in the form of a charging socket on the vehicle.

A cable which corresponds to the charging connector 3 of the charging station CS connects to the same, and has lines L' which carry current, as well as a communication line C. A direct current charging process is carried out in the scenario in FIG. 1 via the lines L'. For this purpose, the lines L' are connected to corresponding direct current connectors DC1 and DC2, which in the prior art comprise immobile contact pins on the vehicle end. The charging device on the vehicle EV end can optionally also be used for single-phase alternating current charging, by a connection to a different charging station, wherein for this purpose there are a phase connector L1 and a neutral connector N—which are not contacted in FIG. 1. In the case of alternating current charging, the alternating current is applied to the corresponding connectors N and L1, and then converted by an AC/DC converter 5 into corresponding direct current which charges the energy storage device. In the architecture shown in FIG. 1, as well as the architecture in FIG. 2, a 2-phase or 3-phase AC connection is also possible, but is not illustrated so as to clarify the illustration. In the architecture in FIG. 1, as well as in the architecture in FIG. 2, there is also a galvanic connection from the charging station CS to the ground of the vehicle EV, which is not illustrated so as to clarify the illustration. The corresponding ground connector of the charging connector 2 in this case can be seen in FIG. 3 (see reference number PE).

A control device 4 is included in the charging device of the vehicle EV, which control device transmits information for the charging process via the known pilot connector PI and/or proximity connector PR. The proximity connector PR constitutes a resistor coding for AC charging in the charging connector, wherein the current carrying capacity of the connected plug/cable combination, and thereby the charging current, is determined via said resistor coding (see SAE J1772). For DC charging, the values in IEC 61851 apply. A PWM signal is exchanged with a corresponding control device 7 of the charging station CS via the pilot connector PI. In the case of DC charging, a powerline communication (PLC) signal according to DIN 70121 and/or ISO 15118 is transmitted by the pilot signal in order to thereby determine corresponding parameters of the charging process. The contact and/or the communication via the proximity and pilot connectors is known from the prior art, and is therefore not described in further detail.

The energy storage device 1 is a high-voltage battery (e.g. 380 V) which supplies current to an electric motor, for the purpose of driving the vehicle, as well as to further high-voltage consumers in the high-voltage intermediate circuit (e.g., an electrical air-conditioning unit, 12V DC/DC converter, and the like).

In the case of direct current charging, direct current is generated by way of an AC/DC converter 8 to which alternating current is supplied from the power grid via a transformer 9, and is fed via the lines L' to the connectors DC1 and DC2, and from there via the lines L to the battery 1. In this case, DC contactors S1 and S2 are included on the vehicle EV end, as are DC contactors S3 and S4 on the charging station CS end. For direct current charging, all contactors S1 to S4 are closed. The contactors S1 and S2 are controlled via the control device 4 in such a manner that they are open in the event that there is no connection between the charging connector 2 of the electric vehicle and a charging connector 3 of the charging station, such that the corresponding contact pins on the direct current connectors DC1 and DC2 stop carrying current. In this way, the configuration ensures that no voltage is present if the contact pins DC1, DC2 are touched unintentionally. The corresponding controlling of the contactors S1 and S2 by means of the control device 4 is indicated via a communication line C'. In the charging architecture according to FIG. 1, it is disadvantageous that the integration of corresponding DC contactors in a charging device is complicated. In particular, a separate component is used for this purpose, which makes the charging device more expensive.

Figure 2:
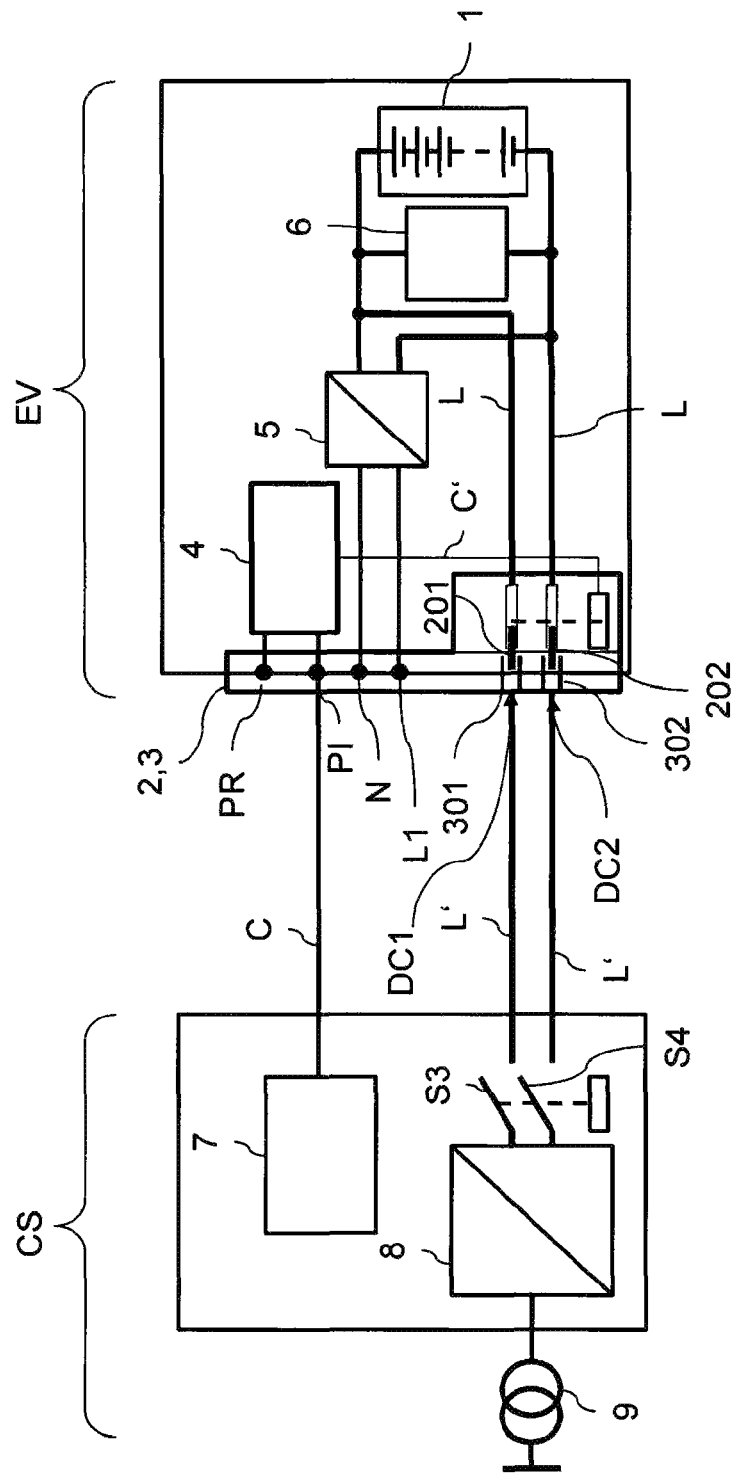
FIG. 2 is a schematic illustration of a charging architecture for the direct current charging of a vehicle by way of one embodiment of the charging device according to the invention.

FIG. 2 shows one embodiment of a charging architecture according to the invention. The same reference numbers have been used here to indicate the same and corresponding components. The charging architecture in FIG. 2 corresponds in large part to the charging architecture in FIG. 1. In particular, it is possible to achieve a direct current charging via corresponding connectors DC 1 and DC 2, and optionally also a single-phase alternating current charging via the connectors L1 and N. Both the charging process and the charging communication are carried out analogously to FIG. 1 via the pilot connector PI and/or the proximity connector PR. The difference between FIG. 1 and FIG. 2 is that the contact pins of the direct current charging connectors DC1 and DC 2 can now be automatically arranged in two positions by way of the control device 4. The corresponding pins inside the charging connector 2 are indicated here by the reference numbers 201 and 202.

When the charging connector 3 and the charging connector 2 are connected, a charging communication is initially carried out, in the conventional manner, between the control device 4 of the vehicle and the control device 7 of the charging station. After the charging station has been successfully identified by the vehicle, and after a determination that the charging station is in good working order, and/or the DC charging cable is in good working order, and voltage has been matched between the charging station and the vehicle, the control device 4 then allows the DC charging process, whereupon the pins 201 and/or 202 travel from a first, withdrawn, position into a second position in which they make contact with corresponding contact sleeves 301 and/or 302 of the charging connector 3 at the charging station CS end, as can be seen in FIG. 2. In the withdrawn and/or retracted position, the pins are sunk into the connector 2 in such a manner that they cannot be touched from outside. As such, in the embodiment in FIG. 2, there can be voltage on the pins 201 and 202 even when the charging connector 2 is unoccupied. Accordingly, in the embodiment in FIG. 2—in contrast to FIG. 1—there is no integration of corresponding contactors S1 and S2 into the galvanic lines L connecting to the electrical energy storage device and/or the high-voltage intermediate circuit 6. In this way, it is possible to produce a less expensive charging device at the vehicle end because the charging architecture is simplified. Moreover, the convenience of the connection between the charging connector of the vehicle and the charging connector of the charging station is increased because the insertion forces are reduced. This is because the corresponding contact pins and contact sleeves are only connected after the connection is made between the two charging connectors.

In contrast to FIG. 1, the control device 4 in FIG. 2 no longer controls any contactors. Rather, it controls a corresponding actuator to deploy and/or retract the contact pins, as shown by a communication line C'. A locking mechanism is also included in the charging architectures in FIG. 1 and FIG. 2, wherein the charging device at the vehicle end locks the mechanical connection between the charging connectors 2 and 3 by way of the locking mechanism. Such a locking mechanism is known from the prior art, and therefore not described in greater detail. The locking is performed, by way of example, upon the detection of a valid pilot signal at the pilot connector PI.

FIG. 3 is a perspective illustration of a charging connector 2 on the vehicle end, in the form of a charging socket (also termed a "vehicle inlet"), of the known COMBO 2 type, which is defined in the IEC 62196-3 standard. The charging socket can be connected to a corresponding charging plug 3 on the charging station end. Because the construction of the charging socket and the charging plug is known, FIG. 3 only shows the charging socket for reasons of clarity. In the region at top, the charging socket includes the pilot connector PI and the proximity connector PR, which are implemented in cylindrical jacks by corresponding contact pins (not visible in FIG. 3). In addition, along with a ground PE, three-phase alternating current connectors L1, L2, L3 and N are included, which are constructed as contact pins 203, 204, 205 and 206 in corresponding cylindrical jacks. If the charging socket in FIG. 3 is used in the charging device in FIG. 2, only the connectors L1 and N are used for single-phase alternating current charging. Nonetheless, in other architectures, charging devices can be included which can be used for a multi-phase charging—in addition to or as an alternative to a single-phase alternating current charging—via the additional connectors L2 and L3.

In the lower portion, the charging socket in FIG. 3 has the direct current connectors DC1 and DC2 described above, wherein the connector DC1 is the plus (positive +) pole and the connector DC2 is the minus (negative −) pole. The connectors are implemented by the pins 201 and 202 described above, which in turn are arranged in corresponding cylindrical jacks. The pins 201 and 202 are fixed in the conventional manner such that they must be disconnected from current when the charging connector 2 is unoccupied, by way of the contactors S1 and S2 (see FIG. 1). According to the invention, however, the contact pins 201 and 202 can now be retracted—that is, pulled downward (inward) back into the corresponding plugs—such that they are not accessible from outside the vehicle. As mentioned above, it is then no longer necessary for current to the contact pins 201 and 202 to be interrupted, and therefore the contactors S1 and S2 can be dispensed with.

Figure 4:
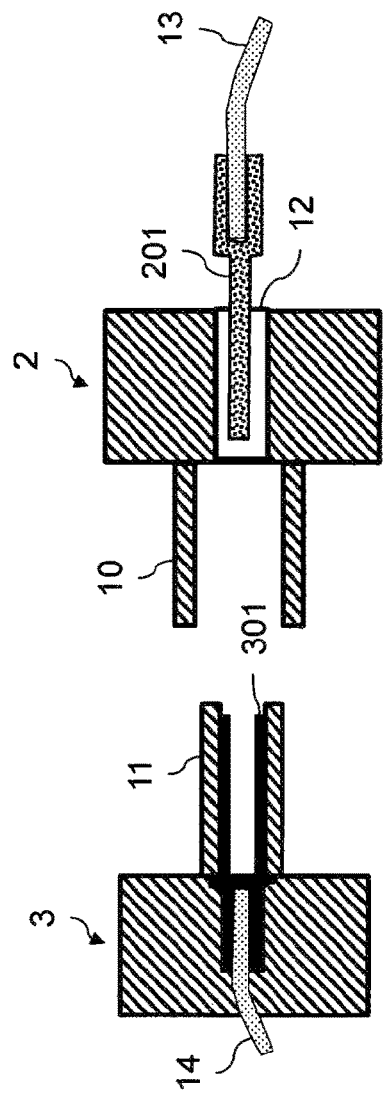
FIG. 4 is a cutaway view illustrating a first part of a deployment of a contact pin used for direct current charging, according to one embodiment of the invention.
Figure 5:
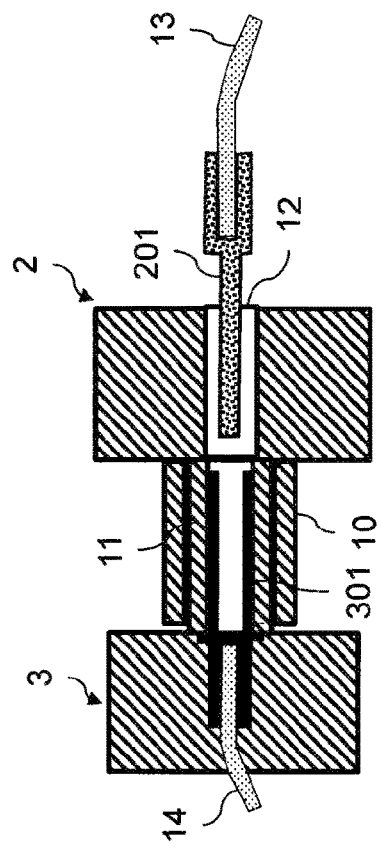
FIG. 5 is a cutaway view illustrating a second part of a deployment of a contact pin used for direct current charging, according to one embodiment of the invention.
Figure 6:
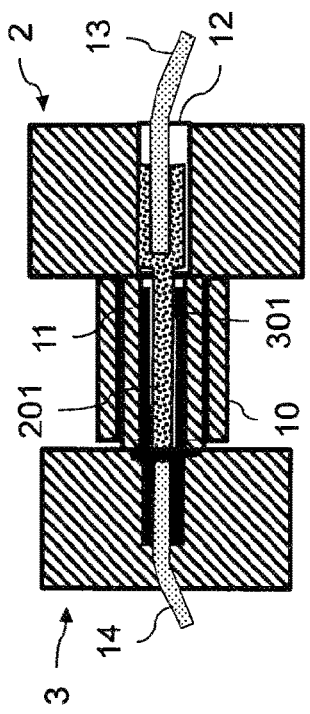
FIG. 6 is a cutaway view illustrating a third part of a deployment of a contact pin used for direct current charging, according to one embodiment of the invention.

FIG. 4 to FIG. 6 show cutaway views of the contact between the direct current connector DC 1 of the charging socket 2 in FIG. 3 and a corresponding connector 3 on the charging station end. In FIG. 4, there is not yet a connection between the charging device of the vehicle and the charging station. In this case, the corresponding contact pin 201 is sunk into a cylindrical recess 12 which is connected to the cylindrical jack 10. The contact pin is connected to a corresponding contact line 13 via a crimp connection, said line 13 leading to one of the lines L in FIG. 2. On the charging station end, the corresponding contact is constructed as a contact sleeve 301, which is arranged inside a cylindrical jack 11, the outer diameter of which corresponds to the inner diameter of the jack 10. The contact sleeve 301 is itself connected to a corresponding contact line 14 via crimps. In the scenario in FIG. 4, the contact pin 201 is protected from touch due to its sunken position, and therefore there is no need to interrupt current to the same.

FIG. 5 shows the scenario in which the connector 3 of the charging station is inserted into the connector 2 of the vehicle. As can be seen, the two cylinders 10 and 11 now are in contact with each other, and the contact sleeve 301 is positioned adjacent to the cylindrical recess 12. The contact pin 201 in this case is still in the withdrawn position. In this position, the charging communication between the charging device of the vehicle and the charging station is initiated, thereby initializing the charging process. If the initialization is successful, the contact pin 201 is then inserted into the contact sleeve 301, this process being triggered by the control device 4, such that the electrical contact between the charging device on the vehicle end and the charging station is made in this way for the purpose of direct current charging. The contact pin 201 is then in the position shown in FIG. 6. The contact pin is moved by a suitable actuator which can have varying designs according to the embodiment. In one variant, the actuator is an electric motor by which the contact pin 201 can be moved between the position shown in FIG. 4 and the position shown in FIG. 6. The contact pin in this case is preferably held in the position shown in FIG. 4 by way of a spring force in the event that the current to the actuator is interrupted. In this manner, the configuration ensures that there is still protection against touch in the event that the actuator fails.

The embodiments described above are in reference to the COMBO 2 type plug connection. Nonetheless, the invention can also be realized with other types of plug connections—such as the COMBO 1 plug connection for example, which is likewise described in the IEC 62196-3 standard identified above. Moreover, the invention can optionally also be used for charging connectors wherein contacts which are specifically intended for alternating current charging are used for direct current charging. By way of example, the charging connectors indicated in FIG. 3 by L2 and L3 can optionally also be used for direct current charging.

The invention described in the proceeding has a range of advantages. In particular, the invention enables protection against touch for direct current connectors in a charging device on-board a vehicle, via moving contact pins. In one preferred variant, there are no further contactors in the galvanic connection between the DC contacts and the energy storage device and/or high-voltage intermediate circuit being charged, thereby simplifying the charging architecture and saving expenses. Moreover, the invention has the advantage of enabling a mechanical connection of the connector on the vehicle end with the charging connector on the charging station end with lower friction, because the connection between contact pins and their corresponding contact sleeves, said connection involving friction, is only made after the mechanical connection of the charging connectors.

LIST OF REFERENCE NUMBERS

EV electric vehicle
CS charging station
L, L' electrical lines
C, C' communication lines
L1, L2, L3, N alternating current connectors
DC1, DC2 direct current connectors
PI pilot connector
PR proximity connector
PE ground connector
1 electrical energy storage device
2 charging connector on-board the vehicle
3 charging connector at the charging station end
4 control device
5 AC/DC converter
6 high-voltage intermediate circuit
7 control device
8 AC/DC converter
S1, S2, S3, S4 contactors
201, 201, . . . , 206 contact pins
301, 302 contact sleeves
9 transformer
10, 11 jacks
12 cylindrical recess
13, 14 electrical lines The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for an electric vehicle having an electrical energy storage device, comprising:
    a first charging connector on a vehicle end for a mechanical connection to a second charging connector of an external charging station, wherein the first charging connector has two electrical contact elements for direct current charging of the electrical energy storage device in the electric vehicle, which two electrical contact elements are able to establish an electrical connection with the external charging station via contact thereof with two electrical contacts of the second charging connector when the mechanical connection is established between the first and the second charging connectors;

a galvanic connection from the two electrical contact elements to the electrical energy storage device, wherein, for direct current charging via the galvanic connection, direct current which is fed to the two electrical contact elements of the first charging connector via the two electrical contacts of the second charging connector flows into the electrical energy storage device for charging the same; and a control device configured to monitor the charging of the electrical energy storage device, and to communicate with the external charging station;

wherein:

at least one of the two electrical contact elements of the first charging connector is configured to move between a first and a second position, wherein the at least one electrical contact element is withdrawn in the first charging connector when in the first position, and when in the second position is extended out of the first charging connector such that electrical contact is made with a corresponding one of the two electrical contacts of the second charging connector when the mechanical connection is established between the first and the second charging connectors, and the control device is further configured to control movement of the at least one electrical contact element such that the at least one electrical contact is only moved into the second position when the mechanical connection is established between the first and the second charging connector, and otherwise is in the first position.

2. The charging device according to claim 1, wherein the galvanic connection to the electrical energy storage device is permanent.

3. The charging device according to claim 1, wherein the two electrical contact elements used for direct current charging are contact pins, the contact pins being configured to electrically contact corresponding contact sleeves in the second charging connector.

4. The charging device according to claim 2, wherein the two electrical contact elements used for direct current charging are contact pins, the contact pins being configured to electrically contact corresponding contact sleeves in the second charging connector.

5. The charging device according to claim 1, further comprising
further electrical contact elements for alternating current charging, which further electrical contact elements are connected to an AC/DC converter for converting supplied alternating current into direct current to charge the electrical energy storage device.

6. The charging device according to claim 1, wherein the first charging connector is based on IEC 62196-3 standard.

7. The charging device according to claim 6, wherein the first charging connector is one of a Combo-1, Combo-2, or DC Type 2 connector.

8. The charging device according to claim 1, wherein the two electrical contact elements for the first charging connector are movable.

9. The charging device according to claim 1, further comprising:
a lock configured to lock the second charging connector together with the first charging connector when the mechanical connection is establish between the first and second charging connectors.

10. The charging device according to claim 1, wherein when the mechanical connection is established between the first and second charging connectors, a communication connection is establish between the control device and the external charging station.

11. The charging device according to claim 10, wherein:
the communication connection allows for a charging communication to be carried out by the control device for setting parameters of the charging device, and
when the control device allows direct current charging per the charging communication, the at least one contact element is moved from the first position into the second position.

12. The charging device according to claim 1, further comprising:
an electrically driven actuator configured to move the at least one electrical contact element.

13. The charging device according to claim 12, further comprising:
a return force configured to hold the at least one electrical contact element in the first position, and
the at least one electrical contact element being moved from the first position into the second position against the return force via the electrically driven actuator.

14. An electric vehicle having an electrical energy storage device, comprising:
a charging device for the electric vehicle, the charging device comprising:
a first charging connector on a vehicle end for a mechanical connection to a second charging connector of an external charging station, wherein the first charging connector has two electrical contact elements for direct current charging of the electrical energy storage device in the electric vehicle, which two electrical contact elements are able to establish an electrical connection with the external charging station via contact thereof with two electrical contacts of the second charging connector when the mechanical connection is established between the first and the second charging connectors;
a galvanic connection from the two electrical contact elements to the electrical energy storage device, wherein, for direct current charging via the galvanic connection, direct current which is fed to the two electrical contact elements of the first charging connector via the two electrical contacts of the second charging connector flows into the electrical energy storage device for charging the same; and
a control device configured to monitor the charging of the electrical energy storage device, and to communicate with the external charging station;
wherein at least one of the two electrical contact elements of the first charging connector is configured to move between a first and a second position, wherein the at least one electrical contact element is withdrawn in the first charging connector when in the first position, and when in the second position is extended out of the first charging connector such that electrical contact is made with a corresponding one of the two electrical contacts of the second charging connector when the mechanical connection is established between the first and the second charging connectors, and wherein the control device is further configured to control movement of the at least one electrical contact element such that the at least one electrical contact is only moved into the second position when the mechanical connection is established between the first and the second charging connector, and otherwise is in the first position.

15. A charging device of an electric vehicle equipped with an electrical energy storage device that stores energy usable in driving the electric vehicle, the charging device comprising:

a vehicle charging connector comprising first and second electrical contact elements configured to permit direct current charging of the electrical energy storage device;

a permanent galvanic connection extending from the first and second electrical contact elements of the vehicle charging connector to the electrical energy storage device, wherein direct current charging of the electrical energy storage device is carried out via the galvanic connection, wherein at least one of the first and second electrical contact elements of the vehicle charging connector is configured to move between first and second positions, the at least one electrical contact element being withdrawn in the vehicle charging connector in the first position, and the at least one electrical contact element of the vehicle charging connector being extended out of the first charging connector in an operation position for receiving direct current when in the second position.

16. The charging device according to claim 15, further comprising:

a control device configured to monitor charging of the electrical energy storage device, the control device controlling movement of the at least one electrical contact element from the first position to the second position.

17. The charging device according to claim 15, wherein both the first and second electrical contact elements of the vehicle charging connector are movable between the first and second positions.

18. The charging device according to claim 15, wherein the first and second electrical contact elements of the vehicle charging connector are configured as pins, the pins being adapted for receipt in corresponding contact sleeves of a non-vehicle arranged charging connector through which direct current is supplied to the first and second pins of the vehicle charging connector.

* * * * *